United States Patent
Andoh et al.

(10) Patent No.: US 7,301,685 B2
(45) Date of Patent: Nov. 27, 2007

(54) OPTICAL SCANNING APPARATUS AND ITS OPTICAL ELEMENT, METHOD AND APPARATUS FOR POSITIONING AND FIXING THE OPTICAL ELEMENT, AND A MOLDING TOOL FOR MAKING THE OPTICAL ELEMENT

(75) Inventors: Fumikata Andoh, Atsugi (JP); Shinichi Ozaki, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 178 days.

(21) Appl. No.: 10/965,773

(22) Filed: Oct. 18, 2004

(65) Prior Publication Data
US 2005/0128550 A1   Jun. 16, 2005

(30) Foreign Application Priority Data
Oct. 17, 2003   (JP)   ............... 2003-358380

(51) Int. Cl.
   *G02B 26/08* (2006.01)
(52) U.S. Cl. ...................................... 359/212
(58) Field of Classification Search ........ 359/204–206, 359/209, 210
See application file for complete search history.

(56) References Cited

U.S. PATENT DOCUMENTS

| | | | |
|---|---|---|---|
| 6,097,749 A | 8/2000 | Naoe et al. | |
| 6,151,151 A | 11/2000 | Ozaki et al. | |
| 6,175,439 B1 | 1/2001 | Ozaki et al. | |
| 6,201,624 B1 | 3/2001 | Ozaki et al. | |
| 6,243,124 B1 | 6/2001 | Ozaki et al. | |
| 6,268,876 B1 | 7/2001 | Ozaki et al. | |
| 6,275,249 B1 | 8/2001 | Ozaki et al. | |
| 6,343,092 B1 | 1/2002 | Naoe et al. | |
| 6,353,455 B1 | 3/2002 | Ozaki et al. | |
| 6,798,820 B2 | 9/2004 | Okuwaki et al. | |
| 2004/0057093 A1 | 3/2004 | Andoh et al. | |

FOREIGN PATENT DOCUMENTS

| JP | 04-127115 | 4/1992 |
|---|---|---|
| JP | 10-003052 | 1/1998 |
| JP | 11-028745 | 2/1999 |
| JP | 2000-141413 | 5/2000 |

*Primary Examiner*—Euncha P. Cherry
(74) *Attorney, Agent, or Firm*—Oblon, Spivak, McClelland, Maier & Neustadt, P.C.

(57) ABSTRACT

Method and apparatus for optical scanning includes a sliding bed and a center adjusting unit. The sliding bed predetermines a position of an optical element in a light axis direction. The optical element has at least one lens surface to be have been subjected to a precision-figure transferring and optically scanning at least one light beam generated by a plurality of light sources and deflected by a rotary mirror. The center adjusting unit moves the optical element to make a lateral center of a curvature radius of the optical element exactly on a light axis center. This paper also describes an optical element itself, a method and apparatus for positioning and fixing the optical element. This paper further describes a molding tool for making the optical element.

9 Claims, 7 Drawing Sheets

OPTICAL SCANNING APPARATUS AND ITS OPTICAL ELEMENT, METHOD AND APPARATUS FOR POSITIONING AND FIXING THE OPTICAL ELEMENT, AND A MOLDING TOOL FOR MAKING THE OPTICAL ELEMENT

BACKGROUND OF THE INVENTION

1. Field of the Invention

The present invention relates to an optical scanning apparatus, and more particularly to an optical scanning apparatus which uses a multi-layered optical element system. The present invention also relates to an optical element itself, a method and apparatus for positioning and fixing the optical element. The present invention further relates to a molding tool for making the optical element.

2. Discussion of the Background

Generally, an optical scanning system using a lens system for forming an image of multiple laser beams uses known techniques including a plastic-made image forming lens capable of being instantly multi-layered corresponding to the multiple laser beams and a method of making a multi-layer lens system. Also, an optical scanning apparatus using such method of making a multi-layer lens system is known.

In particular, there is an optical scanning apparatus employed in an multi-color image forming apparatus. In such multi-color image forming apparatus, a plurality of light sources generate laser beams which are in turn directed to respective photosensitive members via a deflection mechanism and an image focusing mechanism and form separate color images according to colors on the respective photosensitive members.

Further, there is an image forming apparatus such as a digital copier and a laser printer using four photosensitive members in response to increasing demands for a high speed processing and a high image quality. This image forming apparatus forms a color image as follows. The four photosensitive members are previously aligned in parallel to each other along in a direction of sheet transferring. The photosensitive members are exposed simultaneously to light beams generated in accordance with these four photosensitive members to form latent images. The latent images are developed with different color toners: yellow, magenta, cyan, and black toners. The developed toner image in different colors are in turn overlaid in synchronism with each other into a single full-color image.

The above-described various image forming apparatuses adopt a plurality of optical scanning mechanisms; however, the adaptation results in upsizing of the apparatus. To attempt to solve this issue, an optical scanning method and apparatus has been introduced. Such optical scanning method and apparatus uses a lens system including a plurality of image focusing lenses made in a multi-layered unified form; however, in this method and apparatus, positioning of such a lens system is not appropriately established.

SUMMARY OF THE INVENTION

This patent specification describes a novel optical scanning apparatus. In one example, a novel optical scanning apparatus includes a sliding bed and a center adjusting unit. The sliding bed is configured to predetermine a position of an optical element in a light axis direction. The optical element has at least one lens surface to be have been subjected to a precision-figure transferring and optically scanning at least one light beam generated by a plurality of light sources and deflected by a rotary mirror. The center adjusting unit is configured to move the optical element to make a lateral center of a curvature radius of the optical element exactly on a light axis center.

The center adjusting unit may include two arms symmetrically arranged relative to the light axis center and configured to engage with respective side ends of the optical element.

The center adjusting unit may further include a rotating member configured to move the two arms in synchronism with each other simultaneously at a common speed in opposite directions.

The rotating member may include an elastic layer wrapping around a circumferential surface of the rotating member.

The above-mentioned optical element positioning apparatus may further include stopper pins configured to restrict moving ranges of the arms.

The arms may include stopper ribs configured to engage with the stopper pins.

Each of the two arms may include a pressing portion using a shrank spring to predetermine a position of the optical element in a light axis direction.

This patent specification further describes a novel optical element positioning method. In one example, a novel optical element positioning method includes the steps of predetermining and moving. The predetermining step predetermines a position of an optical element in a light axis direction, in which the optical element has at least one lens surface to be have been subjected to a precision-figure transferring and optically scans at least one light beam generated by a plurality of light sources and deflected by a rotary mirror. The moving step moves the optical element to make a lateral center of a curvature radius of the optical element exactly on a light axis center.

This patent specification further describes a novel optical scanning device for optically scanning a plurality of light beams generated by at least one light source and deflected by a rotary mirror. In one example, a novel optical scanning device include a first lens surface and a rib. The first lens surface includes a surface having been subjected to a precision-figure transferring. The rib is formed at a circumferential surface edge of the first lens surface and including a rib portion at each lateral side of the circumferential surface edge configured to be used to determine a lateral position of the optical scanning device.

The rib portion may be projected from other portions of the rib.

The above-mentioned optical scanning device may further include first and second side surfaces and a second lens surface. The first side surface is immediately adjacent to the first lens surface and includes a plurality of first reference surfaces. The second side surface is immediately adjacent to the first lens surface and includes a plurality of second reference surfaces. The second lens surface is immediately adjacent to the first and second side surfaces and opposite to the first lens surface.

The first side surface may include a depression.

The depression may be formed by a block-separation figure forming process.

The plurality of first reference surfaces may be formed in a cylindrical projection shape. One of the plurality of first reference surfaces may be formed at an approximately center of the first side surface in a lateral direction close to the first lens surface, and at least two of the plurality of first reference surfaces may be formed at respective ends of the first side surface in the lateral direction.

The optical scanning device may be made of plastic material.

The optical scanning device may include an f-theta lens.

This patent specification further describes a novel optical scanning device for optically scanning a plurality of light beams generated by at least one light source and deflected by a rotary mirror. In one example, a novel optical scanning device includes a plurality of optical scanning elements. Each one of the plurality of optical scanning elements includes a first lens surface and a rib. The first lens surface includes a surface having been subjected to a precision-figure transferring. The rib is formed at a circumferential surface edge of the first lens surface and includes a rib portion at each lateral side of the circumferential surface edge configured to be used to determine a lateral position of the optical scanning device.

The rib portion may be projected from other portions of the rib.

Each of the plurality of optical scanning elements may further include first and second side surfaces and a second lens surface. The first side surface is immediately adjacent to the first lens surface and includes a plurality of first reference surfaces. The second side surface is immediately adjacent to the first lens surface and includes a plurality of second reference surfaces. The second lens surface is immediately adjacent to the first and second side surfaces and opposite to the first lens surface.

The first side surface may include a depression.

The depression may be formed by a block-separation figure forming process.

The plurality of first reference surfaces may be formed in a cylindrical projection shape. One of the plurality of first reference surfaces may be formed at an approximately center of the first side surface in a lateral direction close to the first lens surface, and at least two of the plurality of first reference surfaces may be formed at respective ends of the first side surface in the lateral direction.

The plurality of optical scanning elements may be formed in shapes equivalent to each other.

The plurality of optical scanning elements may be made of plastic material.

Each of the plurality of optical scanning elements may include an f-theta lens.

Each of the plurality of optical scanning elements may be fixed with an adhesive agent coated around a center area of the first side surface in the lateral direction except for an area of the depression.

The adhesive agent may include a ultra violet radiation curing adhesive agent.

The plurality of optical scanning elements may be fixed stepwise one to another into a multi-layered form.

The plurality of optical scanning elements may be fixed at one time into a multi-layered form. This patent specification further describes a novel optical scanning apparatus. In one example, a novel optical scanning apparatus includes a plurality of light sources, a rotary mirror, and an optical scanning device. The plurality of light sources generate a plurality of light beams. The rotary mirror is configured to deflect the plurality of light beams. The optical scanning device is configured to optically scan the plurality of light beams generated by the plurality of light sources and deflected by the rotary mirror. The optical scanning device includes a plurality of optical scanning elements. Each one of the plurality of optical scanning elements includes a first lens surface and a rib. The first lens surface includes a surface having been subjected to a precision-figure transferring. The rib is formed at a circumferential surface edge of the first lens surface and includes a rib portion at each lateral side of the circumferential surface edge configured to be used to determine a lateral position of the optical scanning device.

This patent specification further describes a novel plastic lens molding tool. In one example, a novel plastic lens molding tool includes at least two mirror surface blocks and at least two nested blocks. The at least two nested blocks are respectively arranged in contact with the at least two mirror surface blocks on a one-to-one basis to respectively form a reference rib groove on a top of a border surface between one of the at least two mirror surface blocks and one of the at least two nested blocks in contact to each other.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
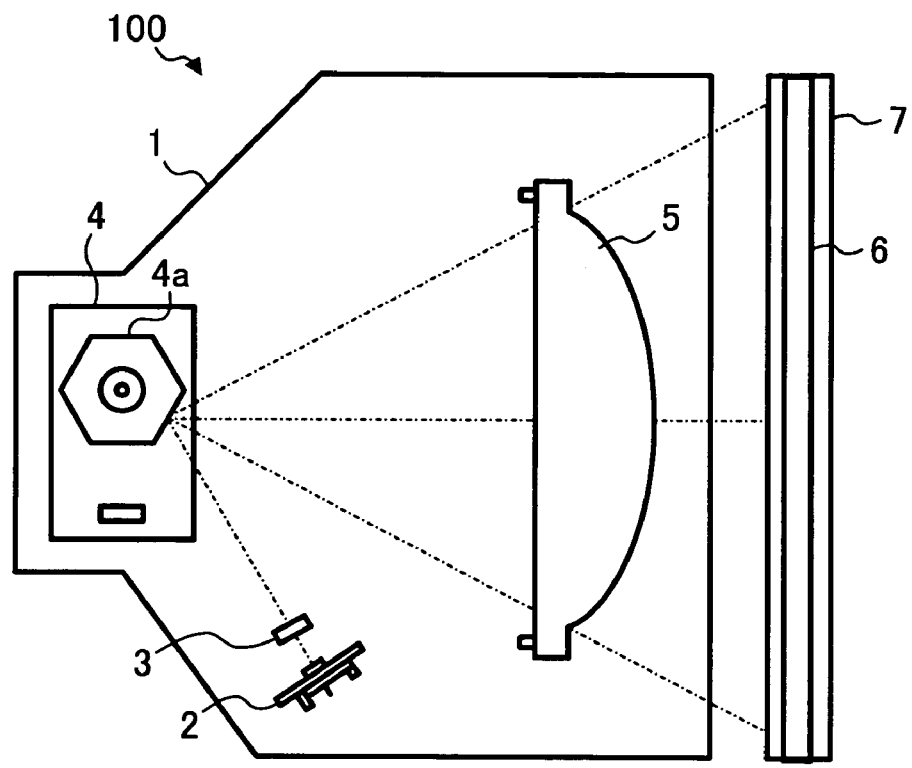
FIG. 1 is a schematic diagram for explaining an optical scanning apparatus according to an exemplary embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 1, an optical scanning apparatus according to an exemplary embodiment of the present invention is explained. FIG. 1 illustrates the optical scanning apparatus 100 which is typically used in an image forming apparatus such as a digital copying machine, a laser printer, and so forth.

The optical scanning apparatus 100 of FIG. 1 includes a case 1, a laser diode 2, a cylindrical lens 3, a polygon scanner unit 4, an optical element 5, and a mirror 6. FIG. 1 also illustrates a photosensitive member 7 which is arranged outside the optical scanning apparatus 100 but within the image forming apparatus. This photosensitive member 7 is used as an image carrying member for carrying an image written by the optical scanning apparatus 100. The optical element 5 is an f-theta lens, for example.

Figure 2:
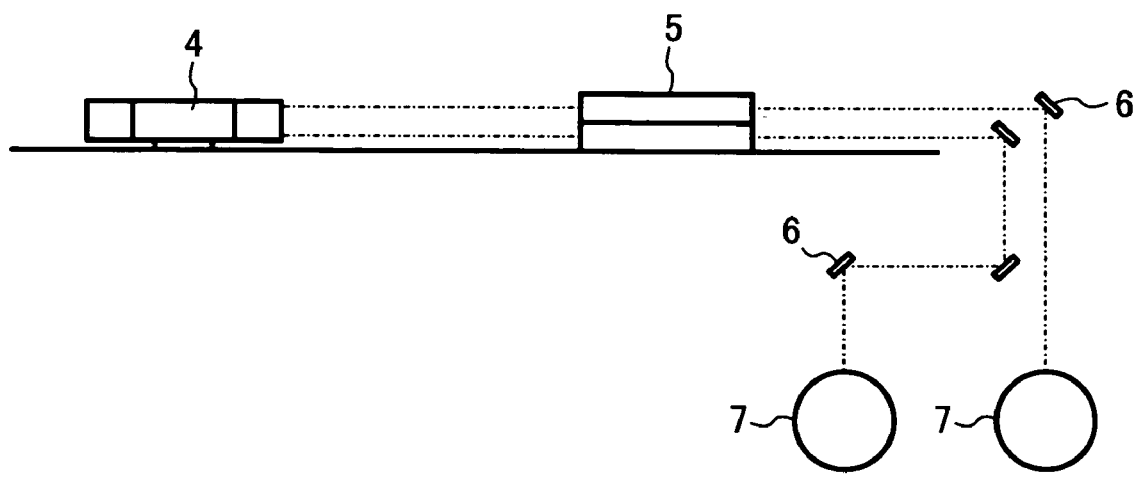
FIG. 2 is a schematic diagram for explaining an optical scanning apparatus according to another exemplary embodiment of the present invention.

As illustrated in FIG. 2, it is possible to employ an optical system using two photosensitive members 7 in the image forming apparatus based on the structure of the optical scanning apparatus 100 of FIG. 1. Furthermore, another optical system employing more than two photosensitive members can be achievable.

The case 1 of the optical scanning apparatus 100 is made of resin material, for example, and accommodates various optical components therein including the laser diode 2, the cylindrical lens 3, the polygon scanner unit 4, and the optical element 5. The laser diode 2 emits laser light. The cylindrical lens 3 condenses the laser light emitted by the laser diode 2 and directs the laser light to the polygon scanner unit 4. The polygon scanner unit 4 includes a rotary polygon mirror 4a which has a plurality of mirrors and is driven to rotate at a constant rotation speed so that laser light impinges on one of the plurality of mirrors is deflected at a constant angular velocity to form a scanning laser beam. The scanning laser beam generated by the deflection of the rotary polygon mirror 4a passes through the optical element 5 and is reflected by the mirrors 6 towards the photosensitive members 7.

In the case of optical system illustrated in FIG. 2, a dual laser beam system is employed in which two scanning laser beams are generated. Each of the two laser beams is caused to irradiate a corresponding one of the photosensitive members 7 via the optical element 5 and the mirrors 6.

Each one of the scanning laser beams impinging on the corresponding one of the photosensitive members 7 scans the surface of the photosensitive member 7 in a main scanning direction at a constant velocity by an action of the optical element 5.

Figure 3:
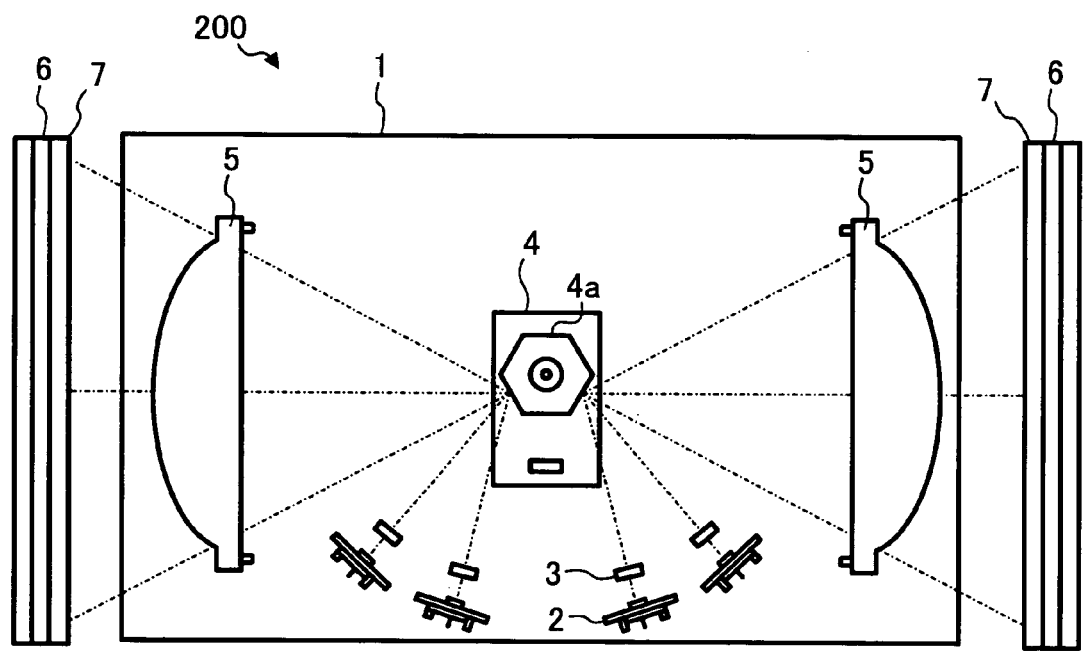
FIGS. 3 and 4 are schematic diagrams for explaining an optical scanning apparatus according to another exemplary embodiment of the present invention.
Figure 4:
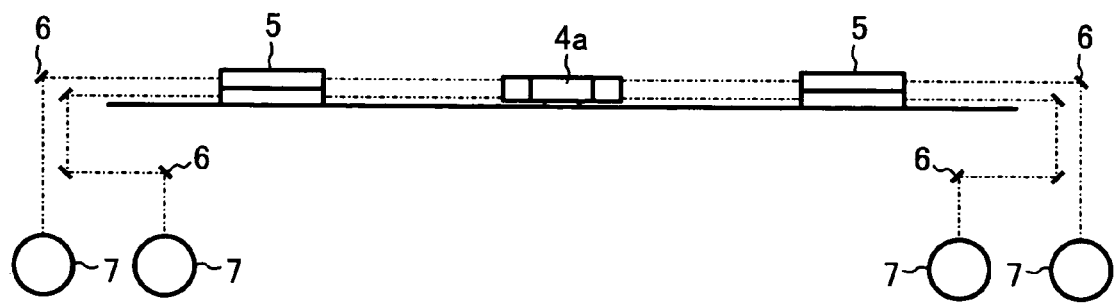

With reference to FIGS. 3 and 4, another optical scanning apparatus 200 is explained, which is used in a color image forming apparatus such as a digital color copying machine, a color laser printer, and so forth.

The optical scanning apparatus 200 of FIG. 3 employs four laser beam scanning system for writing an image in color. As illustrated in FIG. 3, the optical scanning apparatus 200 includes a case 1a, four combinations of the laser diode 2 and the cylindrical lens 3, the polygon scanner unit 4, two sets of the optical element 5 and the mirror 6. FIG. 3 also illustrates two sets of the photosensitive member 7 which is arranged outside the optical scanning apparatus 200 but within the color image forming apparatus.

Figure 5:
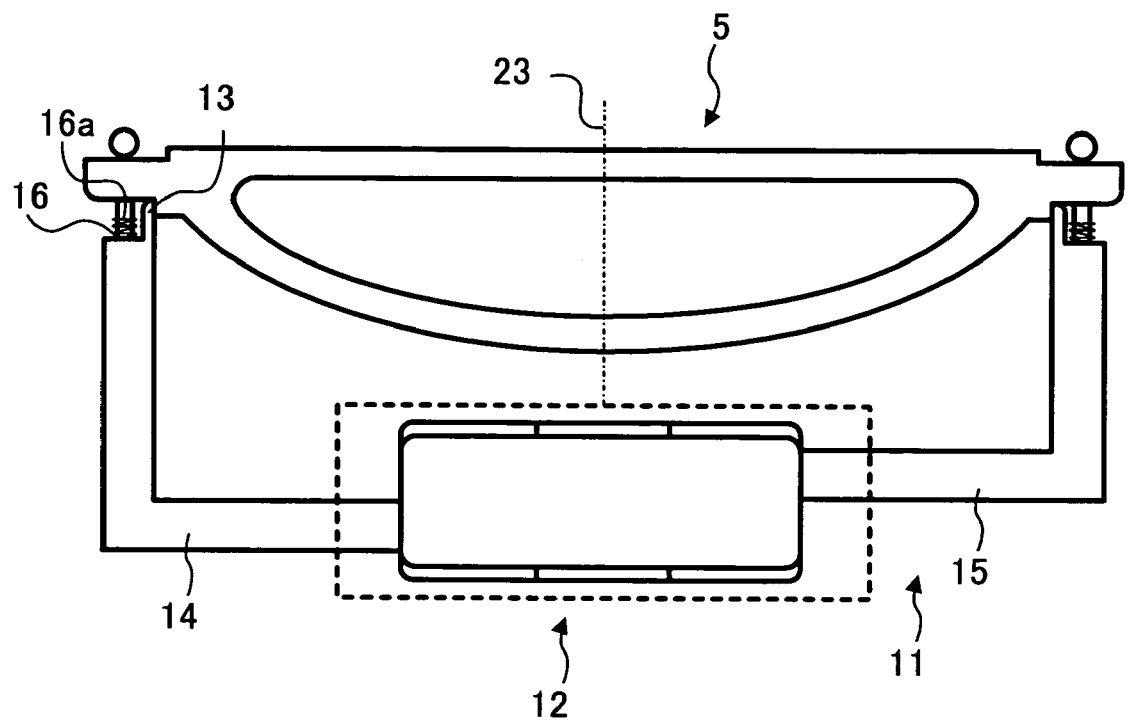
FIG. 5 is a schematic diagram for explaining a positioning tool engaged with an exemplary optical scanning device.

FIG. 5 illustrates a positioning tool 11 for determining appropriate positions of the optical components such as the optical element 5 in the optical scanning apparatuses 100 and 200. As illustrated in FIG. 5, the positioning tool 11 includes a centering mechanism 12 and arms 14 and 15. The centering mechanism 12 is arranged between the arms 14 and 15 to form, as a whole, a U-like shape. Each of the arms 14 and 15 includes a projection portion 13 and a spring holder 16. The projection portion 13 is formed on an end of each of the arms 14 and 15. The spring holder 16 is formed at a side of the projection portion 13 and is configured to hold a spring 16a in a shrank state. Reference numeral 23 denotes a light axis center.

Figure 6:
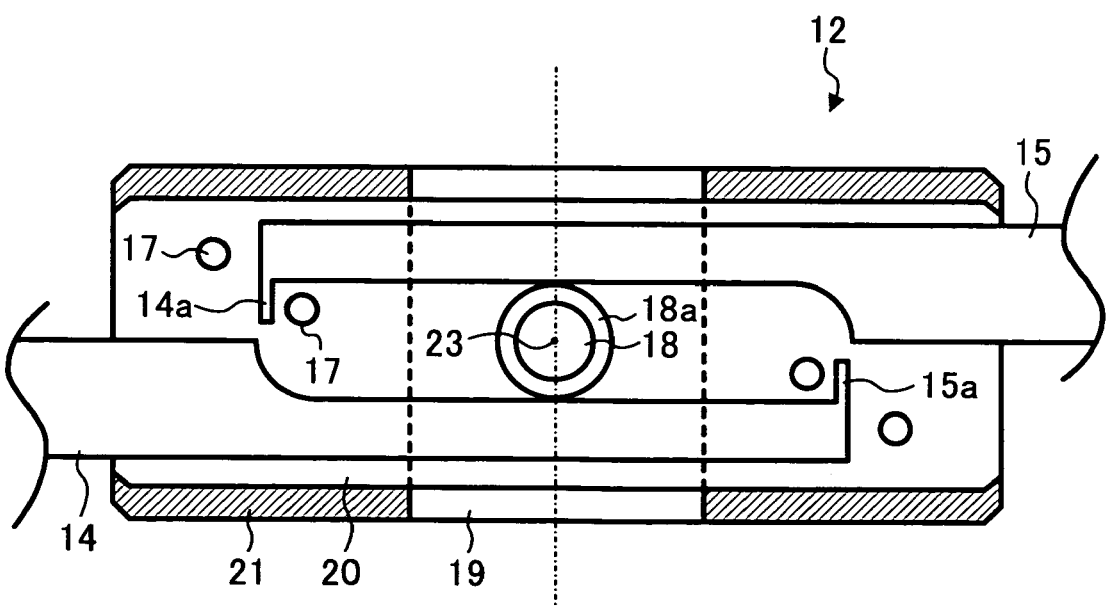
FIGS. 6 and 7 are schematic diagrams for explaining a centering mechanism included in the positioning tool of FIG. 5.
Figure 7:
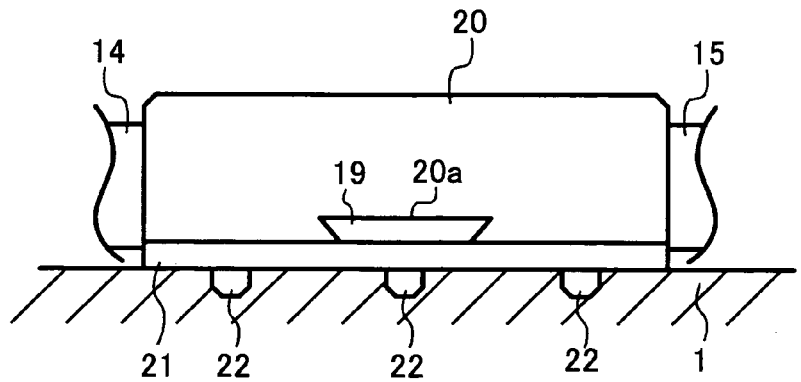

Further details of the centering mechanism 12 are explained with reference to FIGS. 6 and 7. As illustrated in FIG. 6, the centering mechanism 12 is formed approximately in a rectangular shape, and includes a slide rail 19, a slide base, and a reference base 21. The reference base 21 is used as a centering reference, and the slide rail 19 is arranged on and formed in one piece with the reference base 21. As illustrated in FIG. 7, the slide rail 19 has a cross sectional profile of a reversed trapezoid with an upper base greater than a lower base.

The slide base 20 has a slide hollow 20a at an approximate center of the bottom and is movably mounted on the reference base 21 such that the slide hollow 20a is engaged with the slide rail 19, and is therefore movable along the slide rail 19 in directions orthogonal to the surface of FIG. 7, that is, in directions parallel to the light axis center 23.

As also illustrated in FIG. 7, the centering mechanism 12 further includes three reference pins 22 which are arranged underneath the reference base 21. The three reference pins 22 have a cylindrical shape and are engaged with holes formed in the surface of the case 1 so that the centering mechanism 12 is appropriately positioned relative to the case 1. One of the three reference pins 22 is arranged at a position close to the optical element 5 and at which it axis intersects the light axis center 23. The rest of the three reference pins 22 are arranged at positions away from the optical element 5 and away from each other relative to the light axis center 23 and at which their axes are in parallel to the light axis center 23.

The slide base 20 is provided with a cylindrically-shaped rotating member 18 to an inner wall thereof at a position corresponding to a center area of the slide rail 19, and such rotating member 18 includes an outer elastic member 18a arranged around a perimeter of the rotating member 18. Furthermore, the rotating member 18 and the outer elastic member 18a have a common axis arranged on the light axis center 23.

As illustrated in FIG. 6, the rotating member 18 is sandwiched between the arms 14 and 15 via the outer elastic member 18a. The arms 14 and 15 are provided with stopper ribs 14a and 15a, respectively, to their ends. The slide base 20 is provided with a pair of stopper pins 17 to sandwich each of the stopper ribs 14a and 15a, as illustrated in FIG. 6.

There is a mechanical relationship between the arms 14 and 15 and the elastic member 18a such that a driving force is transmitted by a friction force. Namely, when the rotating member 18 is rotated together with the elastic member 18a, the arms 14 and 15 are caused to slide in lateral directions opposite to each other. In this process, the lateral movements of the arms 14 and 15 are restricted by the stopper ribs 17.

As described above, this positioning tool 11 has an exemplary structure in which the arms 14 and 15 are configured to engage with lateral edges of an optical element (e.g., the optical element 5) and to laterally slide in the opposite directions in synchronism with each other through the rotating member 18.

Figure 8:
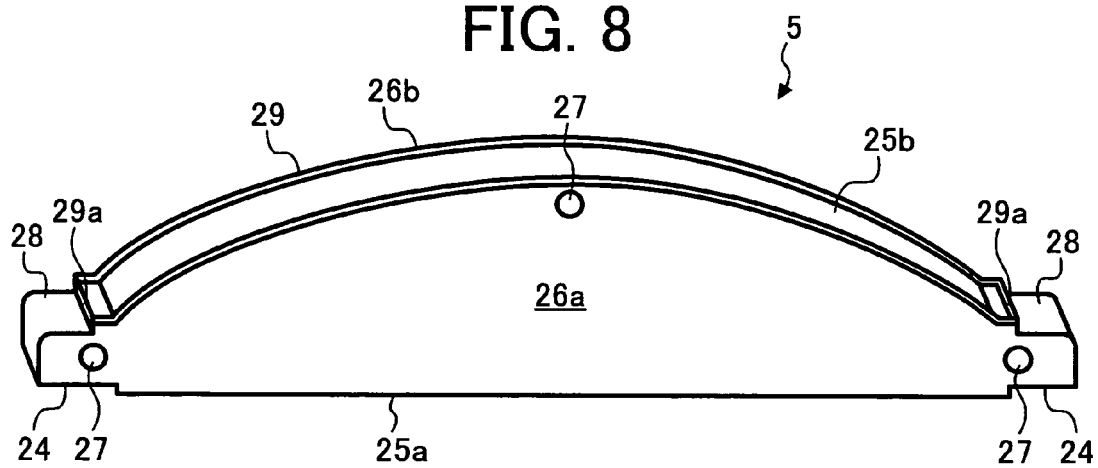
FIGS. 8 and 9 are schematic diagrams for explaining the optical scanning device of FIG. 5.
Figure 9:
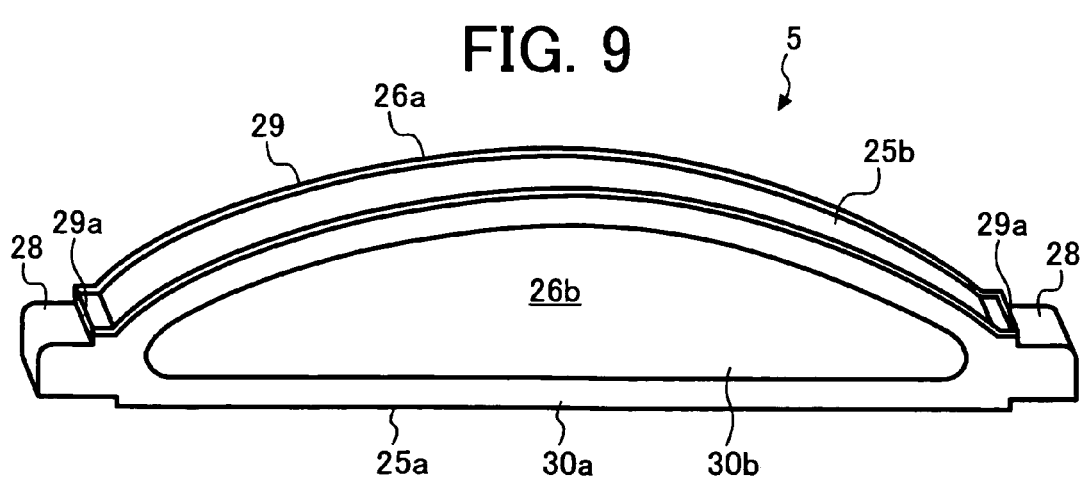

With reference to FIGS. 8 and 9, the optical element 5 according to an exemplary embodiment of the present invention, which is the plastic lens, is explained more in detail. As illustrated in FIGS. 8 and 9, the optical element 5 includes lens surfaces 25a and 25b and side surfaces 26a and 26b. The lens surfaces 25a and 25b and the side surfaces 26a and 26b are those subjected to a highly-precision figure transferring in a plastic molding process and those which light (e.g., the laser beam) enters and exits. The lens surface 25b, from which the laser beam exits, is curbed so that the center portion of the lens has the greatest wall thickness.

The side surfaces 26a and 26b are arranged in parallel to a direction that the laser beams pass through. The side surface 26a is provided with first reference surfaces 27, as illustrated in FIG. 8, formed in a cylindrical shape slightly projecting from the side surface 26a at an approximately center in the lateral direction close to the curbed lens surface 25b and at left and right ends in the lateral direction. The side surface 26b includes a second reference surface 30a and a depression 30b. The second reference surface 30a is made in a highly precision manner; however, the depression 30b is referred to as an imperfect figure-transferred surface and is not made in a highly precision manner.

The optical element 5 is provided with an extended portion 28 at each one of the left and right ends in the lateral direction. The optical element 5 is further provided with a third reference surface 24 formed underneath each of the extended portions 28. The third reference surfaces 24 are used to determine the fixing positions of the optical element 5, together with the first reference surfaces 27.

The curbed lens surface 25b is provided with long ribs 29 and short ribs 29a along its circumferential edges. These ribs 29 and 29a are used to determine the fixing position of the optical element 5 in a highly accurate manner.

To form an optical element having an imperfect-figure-transfer surface with a depression, a plastic molding process generally uses a slidable cavity block. In such process, a pair of molding tools are prepared, in which at least one cavity is formed using figure-transfer surfaces and several cavity blocks.

This process is conducted as follows. The molding tools are maintained, by an application of heat, at a predetermined temperature lower than a temperature at which plastics are softened. Then, a plastic pressure is generated at the transfer surfaces so as to make the plastic closely contacted the transfer surfaces. After that, the plastic is cooled down to a temperature lower than the softening temperature. At this time, the slidable cavity block is slid away from the plastic filled inside the cavity, so that a space is forcibly formed between the slidable cavity block and the plastic. This step is referred to as a block-separation figure forming. As a result, the surface of the plastic exposed to the space is provided with a depression according to the cooling process.

Figure 10:
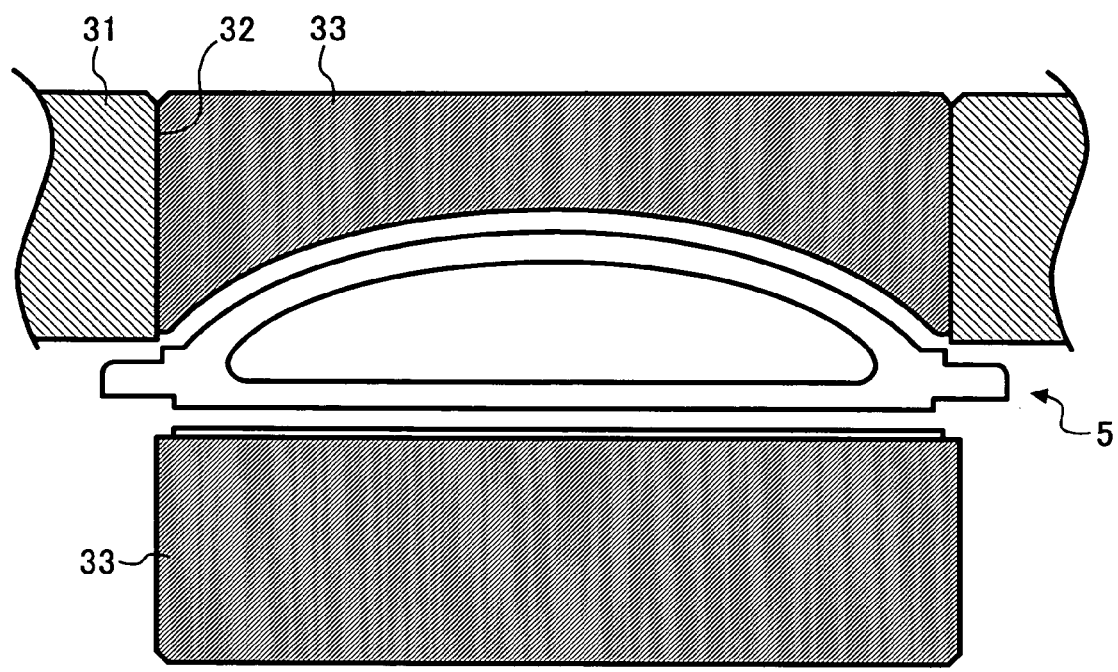
FIGS. 10 and 11 are schematic diagrams for explaining a plastic lens molding tool.
Figure 11:
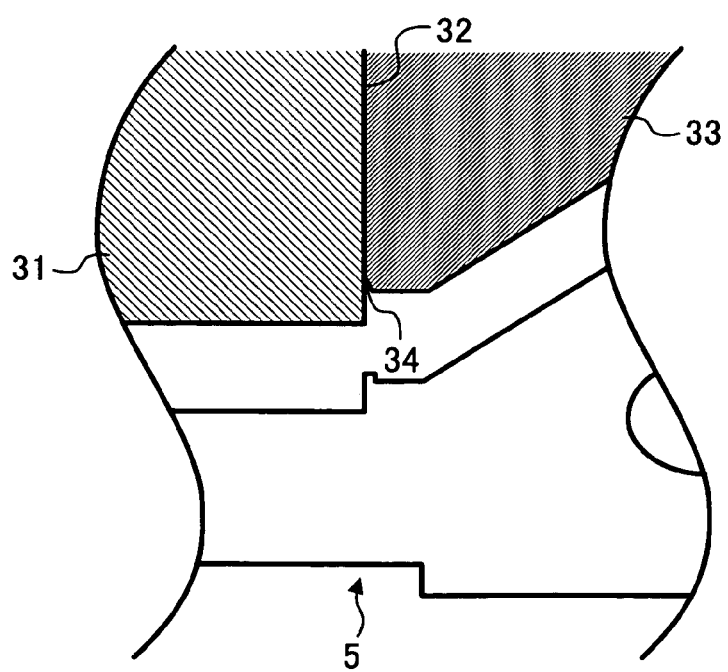

With reference to FIGS. 10 and 11, a mirror surface block and a nested block of a plastic molding tool used in the plastic molding process according to an exemplary embodiment of the present invention are explained. In FIGS. 10 and 11, reference numeral 31 denotes a nested block, reference numeral 32 denotes a nested line, reference numeral 33 denotes a mirror surface block, and reference numeral 34 denotes a reference rib groove. The nested line 32 is a contact surface (i.e., a border surface) of the mirror surface block 33 and the nested block 31. As illustrated in an enlarged view of FIG. 11, the mirror surface block 33 and the nested block 31 are made to form the reference rib groove 34 at an end of the nested line 32 so as to produce the optical element 5 that has transfer surfaces to which a curvature-radius center position of the mirror surface block 33 is transferred in a high precision manner.

Figure 12:
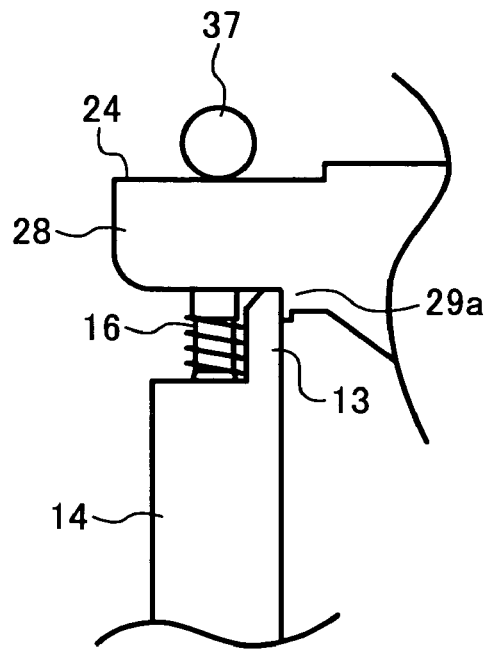
FIGS. 12 and 13 are schematic diagrams for explaining an exemplary procedure of determining the position of the optical scanning device with the positioning tool of FIG. 5.
Figure 13:
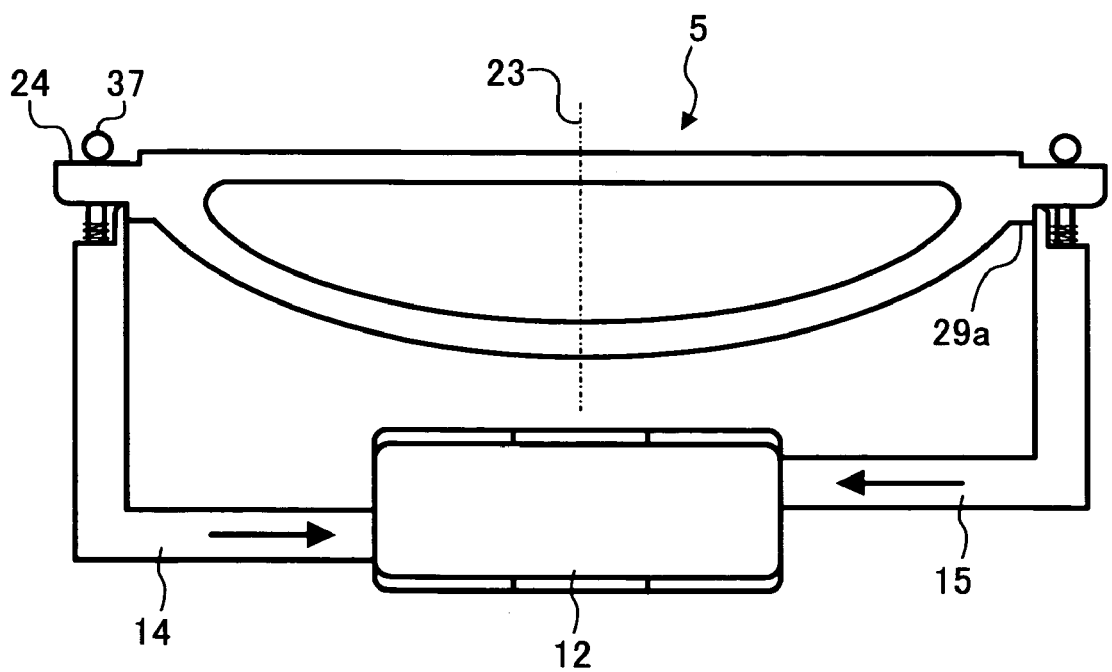

Referring to FIGS. 12 and 13, an exemplary procedure of the positioning operation with respect to the optical element 5 is explained. FIG. 12 illustrates an enlarged view of the engagement between the arm 14 and the optical element 5. FIG. 13 illustrates a movement of the arms 14 and 15, engaged with the optical element 5, from the side edges towards the light axis center 23 of the optical element 5. As a preparatory step, the optical element 5 is placed on the case 1 and the positioning tool 11 is also placed on the case 1 such that the reference pins 22 provided underneath the reference base 21 are engaged with reference holes (not shown) of the case 1.

As illustrated in FIG. 12, the centering mechanism 12 is moved towards the optical element 5 by using the slide rail 19 until the spring holders 16 of the arms 14 and 15 push the extended portions 28 of optical element 5 so that the third reference surface 24 of each of the extended portions 28 contacts a positioning rib 37 provided to the case 1. Thereby, a direction of beam pass is determined.

Then, as illustrated in FIG. 12, the projection portions 13 of the arms 14 and 15 are caused to contact the short ribs 29a. When one of the arms 14 and 15 is moved towards the light axis center 23, the arm's sliding movement is transmitted to the rotating member 18 and is converted into a rotating movement. This rotating movement causes the other arm to slide in an opposite direction, as indicated by arrows in FIG. 13. Thus, via the rotating member 18, the arms 14 and 15 can be slid simultaneously at the same speed. As a result, the optical element 5 can be positioned with the center of the curvature-radius in the lateral direction exactly on the light axis center 23. In this way, the positioning with respect to the scanning direction can be achieved in a highly accurate manner.

The outer elastic member 18a provided to the rotating member 18 facilitates the manipulation of the arms 14 and 15 at the simultaneous and common speed. This leads to a reduction of time to adjust the position of the optical element 5.

In a case a plurality of optical elements (e.g., the optical element 5) are arranged in a multi-layered shape, the molding tool is arranged to have the reference rib groove 34 formed between the mirror surface block 33 and the nested block 31, as illustrated in FIG. 11, so as to make the optical element 5 in which the center position of the curvature radius is transferred in a high precision manner. With this structure, the center position of the curvature radius of the optical element 5 can be determined in a highly precision manner by using the same projection portion 13, regardless of an element layer number. In addition, since the optical elements 5 used in the multi-layer element have the same shape, the positioning can easily be conducted, regardless of an element layer number.

Figure 14:
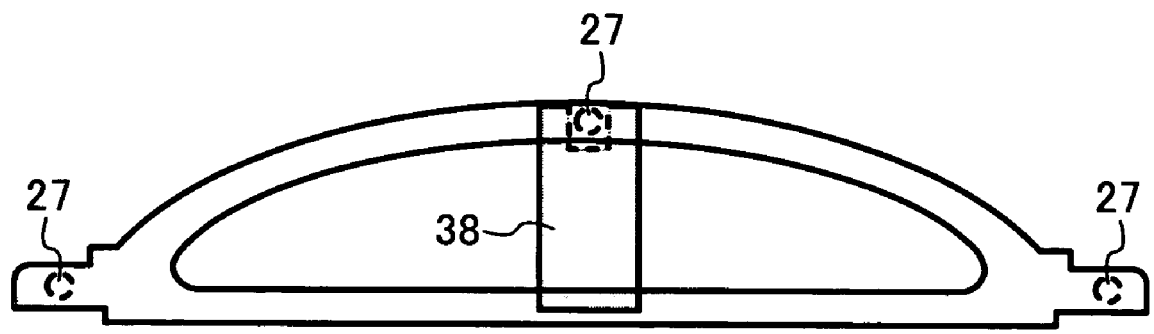
FIGS. 14 and 15 are schematic diagrams for explaining a method of fixing the optical scanning device in a single-layer form and a multi-layered form using an adhesive agent.
Figure 15:
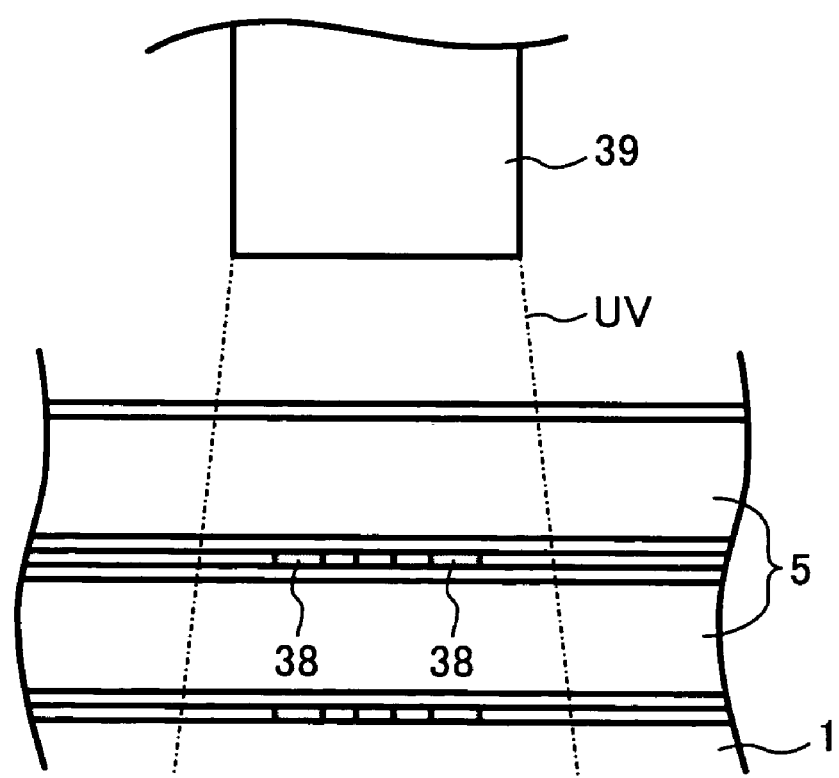

Referring to FIGS. 14 and 15, an exemplary way of coating an adhesive agent to the side surface 26 of the optical element 5 is explained. As illustrated in FIG. 14, the optical element 5 is coated with an adhesive agent 38 at a center area of the side surface 26b in the lateral direction. The adhesive agent 38 is a UV (ultra violet) radiation curing adhesive. The optical element 5 may thermally be expanded due to an environmental temperature, which expansion will change an optical characteristic such as an image forming characteristic of the optical element 5. Therefore, the adhesive agent 38 is coated on a limited area, namely the center area of the side surface 26 in the lateral direction so as not to suffer from the thermal expansion.

After having coated with the adhesive agent 38, a light source 39 is set, as illustrated in FIG. 15, and the adhesive agent 38 is exposed to a UV radiation from the light source 39. As a result, the adhesive agent 38 is cured and the optical element 5 is securely adhered to the case 1 of the optical scanning apparatus 100, for example. This adhering process can be used either the single layer type or the multi-layer type of the optical element 5.

Since the above adhering fixes the optical element 5 with the center area of the side surface 26b in the lateral direction, deviations of the positioning of the optical element 5 with respect to the lateral direction and the light axis direction can be suppressed.

In the case of multi-layered optical element fixed with the adhesive agent 38, since every optical element has the same thermal expansion coefficient, deviations of the positioning of the optical elements with respect to the lateral direction and the light axis direction can be suppressed.

As described above, the center position of the curvature radius of the mirror surface block 33 can be accurately transferred due to the reference rib groove 34 formed between the mirror surface block 33 and the nested block 31. At a time of adhering, the adhesive agent 38 is previously coated to the adhering surfaces of the bottom optical element 5 and the case 1 and also the adhering surfaces of the upper optical elements 5. Then, the positioning is made with respect to the center position of the curvature radius in the lateral direction of the lens surface 25b and at the same time the position of the multi-layered optical element. Thereby, the multi-layered optical element can be fixed in a highly precision manner.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent applications, No. JPAP2003-358380 filed on Oct. 17, 2003, in the Japanese Patent Office, the entire contents of which are incorporated by reference herein.

What is claimed is:

1. An optical element positioning apparatus comprising:
   a sliding bed configured to move an optical element in a light axis direction, the optical element having at least one lens surface configured to be subjected to a precision-figure transferring and an optical scan from at least one light beam generated by a plurality of light sources and deflected by a rotary mirror; and
   a center adjusting unit configured to move the optical element to make a lateral center of a curvature radius of the optical element exactly on a light axis center,
   wherein the center adjusting unit includes two arms symmetrically arranged relative to the light axis center and configured to engage with respective side ends of the optical element.

2. An optical element positioning apparatus of claim 1, wherein the center adjusting unit further includes a rotating member configured to move the two arms in synchronism with each other simultaneously at a common speed in opposite directions.

3. An optical element positioning apparatus of claim 2, wherein the rotating member includes an elastic layer wrapping around a circumferential surface of the rotating member.

4. An optical element positioning apparatus of claim 1, further comprising stopper pins configured to restrict moving ranges of the arms.

5. An optical element positioning apparatus of claim 1, wherein the arms include stopper ribs configured to engage with the stopper pins.

6. An optical element positioning apparatus of claim 1, wherein each of the two arms includes a pressing portion using a compressed spring to predetermine a position of the optical element in a light axis direction.

7. An optical element positioning method, comprising the steps of:
   moving an optical element in a light axis direction using a sliding bed, the optical element having at least one lens surface configured to be subjected to a precision-figure transferring and an optical scan from at least one light beam generated by a plurality of light sources and deflected by a rotary mirror; and
   moving the optical element, using a center adjusting unit that includes two arms symmetrically arranged relative to a light axis center and engages with respective side ends of the optical element, to make a lateral center of a curvature radius of the optical element exactly on the light axis center.

8. The method of claim 7, further comprising:
   moving the two arms in synchronism with each other simultaneously at a common speed in opposite directions.

9. The method of claim 7, further comprising:
   moving the two arms in synchronism with each other simultaneously at a common speed in opposite directions with a rotating member that includes an elastic layer wrapping around a circumferential surface of the rotating member.

* * * * *